United States Patent
Moosmann et al.

(10) Patent No.: US 9,247,592 B2
(45) Date of Patent: Jan. 26, 2016

(54) OPERATING DEVICE WITH POWER FACTOR CORRECTION AND RIPPLE LIMITATION BY CHANGE IN OPERATION

(71) Applicant: TRIDONIC GMBH & CO KG, Dornbirn (AT)

(72) Inventors: Florian Moosmann, Dornbirn (AT); Rainer Troppacher, Dornbirn (AT); Frank Lochmann, Esseratsweiler (DE)

(73) Assignee: TRIDONIC GMBH & CO KG, Dornbirn (AT)

(*) Notice: Subject to any disclaimer, the term of this patent is extended or adjusted under 35 U.S.C. 154(b) by 0 days.

(21) Appl. No.: 14/367,847

(22) PCT Filed: Dec. 21, 2012

(86) PCT No.: PCT/AT2012/000324
§ 371 (c)(1),
(2) Date: Jun. 20, 2014

(87) PCT Pub. No.: WO2013/090957
PCT Pub. Date: Jun. 27, 2013

(65) Prior Publication Data
US 2014/0346965 A1 Nov. 27, 2014

(30) Foreign Application Priority Data
Dec. 23, 2011 (AT) ................. GM680/2011

(51) Int. Cl.
*H05B 33/08* (2006.01)
*H05B 41/36* (2006.01)
*H05B 41/285* (2006.01)

(52) U.S. Cl.
CPC ........ *H05B 33/0806* (2013.01); *H05B 33/0848* (2013.01); *H05B 33/0884* (2013.01); *H05B 41/2856* (2013.01); *H05B 41/36* (2013.01)

(58) Field of Classification Search
USPC ............. 315/192, 193, 247, 200 R, 283, 291, 315/297, 307; 323/222
See application file for complete search history.

(56) References Cited

U.S. PATENT DOCUMENTS

| | | | | |
|---|---|---|---|---|
| 6,043,633 A | * | 3/2000 | Lev et al. | 323/222 |
| 7,233,115 B2 | * | 6/2007 | Lys | 315/291 |
| 7,256,554 B2 | * | 8/2007 | Lys | 315/291 |
| 7,358,706 B2 | * | 4/2008 | Lys | 323/222 |
| 8,742,676 B2 | * | 6/2014 | Taubert | 315/247 |
| 8,760,071 B2 | * | 6/2014 | Taubert | 315/247 |
| 8,853,958 B2 | * | 10/2014 | Athalye et al. | 315/283 |

(Continued)

FOREIGN PATENT DOCUMENTS

| | | |
|---|---|---|
| CN | 201491338 U | 5/2010 |
| DE | 19518096 A1 | 11/1996 |
| DE | 102010003910 A1 | 11/2010 |
| EP | 2302984 A1 | 3/2011 |

(Continued)

*Primary Examiner* — Vibol Tan
(74) *Attorney, Agent, or Firm* — Volpe and Koenig, P.C.

(57) ABSTRACT

Operating device (A) for a luminous means, the operating device having at least one driver circuit for operating at least one luminous means (Last), an energy store (Cbulk) which supplies the driver circuit, a power factor correction circuit which is in the form of a boost converter, supplies the energy store (Cbulk) and has a storage inductor (Lb), an actively clocked switch (S) and a rectifier diode (D), wherein the storage inductor (Lb) has a secondary winding which is arranged in such a manner that said winding is magnetically coupled to the primary winding of the storage inductor (Lb) and is connected in series with a coupling capacitor.

10 Claims, 1 Drawing Sheet

(56) References Cited

U.S. PATENT DOCUMENTS

| | | |
|---|---|---|
| 2010/0265745 A1 | 10/2010 | Xu et al. |
| 2011/0043133 A1 | 2/2011 | Van Laanen et al. |
| 2011/0266964 A1 | 11/2011 | Schlenk et al. |
| 2013/0127353 A1* | 5/2013 | Athalye et al. ............... 315/193 |
| 2013/0207567 A1* | 8/2013 | Mednik ........................ 315/247 |

FOREIGN PATENT DOCUMENTS

| | | |
|---|---|---|
| EP | 2365620 A1 | 9/2011 |
| WO | 9416492 A1 | 7/1994 |
| WO | 2009001279 A1 | 12/2008 |
| WO | 2010143944 A1 | 12/2010 |

* cited by examiner

OPERATING DEVICE WITH POWER FACTOR CORRECTION AND RIPPLE LIMITATION BY CHANGE IN OPERATION

FIELD OF THE INVENTION

The invention relates to an operating device for a light-emitting means and to a method.

Such operating devices are used in lighting systems in order to achieve lighting of rooms, routes or else escape routes. Generally, in this case the light-emitting means are actuated and, if necessary, activated by operating devices. For such illumination, gas discharge lamps or else light-emitting diodes (LEDs) are used as light source.

BACKGROUND

In accordance with the prior art, operating devices for light-emitting means with power factor correction are already used, but these still require a relatively large filter at the input.

SUMMARY

The object of the invention consists in providing an operating device for a light-emitting means which has power factor correction and only transmits very low levels of interference.

This object is achieved by an operating device and a method as set forth in the independent claims. Particularly advantageous embodiments of the invention are described in the dependent claims.

The invention relates to an operating device for a light-emitting means comprising at least one driver circuit for operating at least one light-emitting means, an energy store, which feeds the driver circuit, a power factor correction circuit, which is preferably in the form of a boost converter and feeds the energy store, having a storage inductor, an actively clocked switch and a rectifying diode, characterized in that the voltage at the energy store is monitored, and the operation of the operating device is changed if the ripple of the voltage at the energy store exceeds a predetermined limit value.

The operating device preferably has means for estimating the life of the energy store to be expected. These means for estimating the life to be expected preferably evaluate the detected ripple of the voltage at the energy store. Optionally, in addition also further measurements or actuation variables can be evaluated within the operating device.

The invention also relates to a method for operating light-emitting means, wherein the light-emitting means is operated by at least one driver circuit, a power factor correction circuit feeds the energy store, and an energy store feeds the driver circuit, wherein the voltage at the energy store is monitored, and the operation of the light-emitting means is performed depending on the detected ripple of the voltage at the energy store. The operation of the light-emitting means can preferably be changed when the detected ripple of the voltage at the energy store exceeds a predetermined limit value.

BRIEF DESCRIPTION OF THE DRAWINGS

The invention will be explained in more detail below with reference to the attached drawing, in which.

DETAILED DESCRIPTION OF THE PREFERRED EMBODIMENTS

The invention will be explained below with reference to an exemplary embodiment of an operating device for a light-emitting means.

Figure 1:
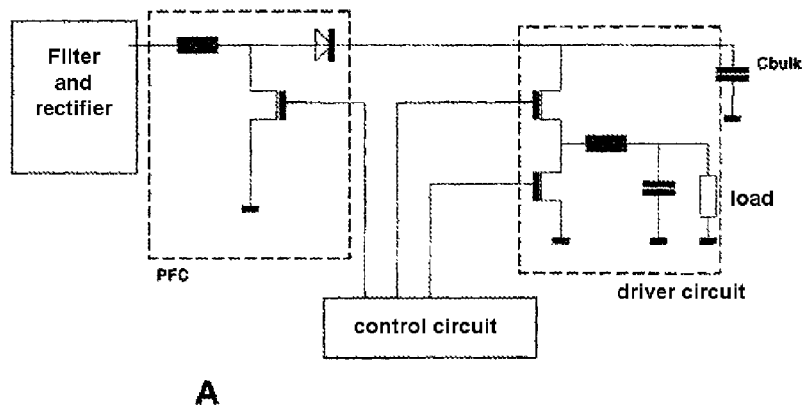
FIG. 1 shows an operating device according to the invention.

FIG. 1 shows an operating device A for a light-emitting means.

Such an operating device A for a light-emitting means typically has a driver circuit (lamp driver) for operating at least one light-emitting means (load), an energy store, which feeds the driver circuit, a power factor correction circuit (PFC), which can be in the form of a boost converter and feeds the energy store, having a storage inductor, an actively clocked switch and a rectifying diode. A filter circuit and a rectifier circuit are preferably connected upstream of the power factor correction circuit. In this example, the driver circuit is a resonant half-bridge for actuating a lamp load. Alternatively, the driver circuit can also be formed by a resonant half-bridge with electrical isolation and rectification at the output for actuating LEDs.

Figure 2:
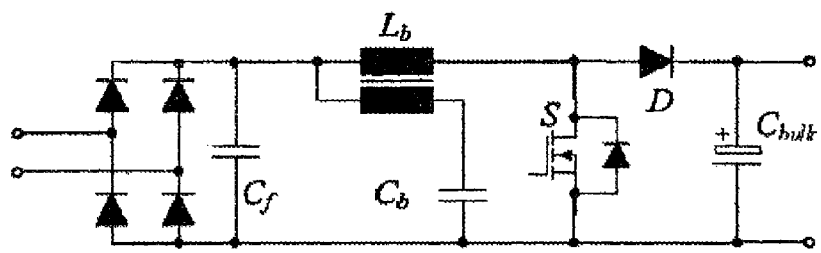
FIG. 2 shows the power factor correction circuit of an operating device in accordance with the invention.

FIG. 2 shows a power factor correction circuit according to the invention for an operating device for a light-emitting means.

The power factor correction circuit is in the form of a boost converter and feeds the energy store Cbulk. The energy store Cbulk is, for example, an electrolytic capacitor. It has a storage inductor Lb, an actively clocked switch S and a rectifying diode D.

The operating device (A) for a light-emitting means has at least one driver circuit for operating at least one light-emitting means, an energy store (Cbulk), which feeds the driver circuit (LED driver), and a power factor correction circuit, which is preferably in the form of a boost converter and feeds the energy store (Cbulk), having a storage inductor (Lb), an actively clocked switch (S) and a rectifying diode (D). The voltage at the energy store (Cbulk) is monitored, and the operation of the operating device (A) is changed if the ripple of the voltage at the energy store (Cbulk) exceeds a predetermined limit value.

The operating device (A) for a light-emitting means can change the operation of the driver circuit (LED driver) and/or of the power factor correction circuit if the ripple of the voltage at the energy store (Cbulk) exceeds a predetermined limit value. The voltage at the energy store (Cbulk) can be decreased if the ripple of the voltage at the energy store (Cbulk) exceeds a predetermined limit value. In the event that a limit value for the ripple of the voltage at the energy store (Cbulk) is exceeded, the control loop or the control parameters of the power factor correction circuit can be changed. In the event that a limit value for the ripple of the voltage at the energy store (Cbulk) is exceeded, the power output by the driver circuit (LED driver) can be reduced.

It is also possible for a plurality of driver circuits (LED drivers) to be fed directly or indirectly from the energy store (Cbulk) and, in the event that a limit value for the ripple of the voltage at the energy store (Cbulk) is exceeded, at least some of the driver circuits (LED drivers) are disconnected. The driver circuit (LED driver) is preferably a circuit with radiofrequency clocking having at least one actively clocked switch and one inductance (L), which is charged and discharged by the radiofrequency clocking. By virtue of the driver circuit with radiofrequency clocking, the LED can be actuated with a high degree of efficiency. The driver circuit (LED driver) is, for example, a buck converter, an isolated flyback converter or an inverter circuit.

Figure 3:
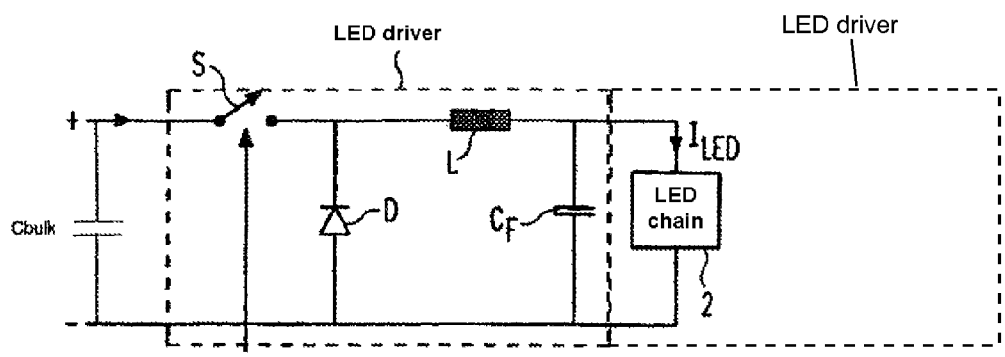
FIG. 3 shows an example of a driver circuit (LED driver) which is in the form of a buck converter.

One example of a driver circuit (LED driver) which is in the form of a buck converter is shown in FIG. 3. The LEDs in the LED string 2 are actuated depending on the clocking of the switch S. In this example, in the event that a limit value for the ripple of the voltage at the energy store (Cbulk) is exceeded, the power output by the driver circuit (LED driver) could be reduced by clocking of the switch S with a reduced duty factor.

The light-emitting means can be an LED or a gas discharge lamp.

The operating device (A) can transmit a fault message via an interface or optical signaling via the light-emitting means can take place in the event that a limit value for the ripple of the voltage at the energy store (Cbulk) is exceeded.

Therefore, the possibility is also provided of a method for operating light-emitting means, wherein the light-emitting means is operated by at least one driver circuit (LED driver). A power factor correction circuit feeds the energy store (Cbulk) and an energy store (Cbulk) feeds the driver circuit (LED driver).

The voltage at the energy store (Cbulk) is monitored, and the operation of the light-emitting means is performed depending on the detected ripple of the voltage at the energy store (Cbulk) a predetermined limit value. Temperature monitoring can be performed at the energy store (Cbulk), the power factor correction circuit or the driver circuit (LED driver) and, as a result of a predetermined limit temperature being exceeded, a reduction in the power transmitted to the light-emitting means or else another change to the operation of the light-emitting means can be performed, and the value of the limit temperature to be predetermined can be set depending on the detected ripple of the voltage at the energy store (Cbulk).

Therefore, a lighting unit having an operating device A for a light-emitting means comprising the power factor correction circuit according to the invention can be constructed.

By evaluating the detected ripple of the voltage at the energy store (Cbulk) and further variables detected from measurements or an evaluation of actuation signals, such as, for example, the power drawn (or else emitted) or else the on time of the actively clocked switch (S) of the power factor correction circuit, the life to be expected of the energy store (Cbulk) and therefore also of the entire operating device (A) can be estimated.

In this way, it is also possible to correct a previous estimation of the life to be expected.

The operating device (A) therefore has means for estimating the life to be expected of the energy store (Cbulk). Said means preferably evaluate the detected ripple of the voltage at the energy store (Cbulk), but it is optionally also additionally possible for further measurements or actuation variables to be evaluated. The operating device is designed for estimating the life to be expected of the energy store (Cbulk) on the basis of the detected ripple of the voltage at the energy store (Cbulk).

On the basis of the monitoring of the on time of the actively clocked switch (S) of the power factor correction circuit, in the case of monitoring of this variable over one or more system half-cycles, it is possible to draw a conclusion in respect of the characteristic of the transmitted power and also indirectly of the ripple of the voltage at the energy store (Cbulk) and/or the input voltage.

The operating device (A) can also have further power stages connected in series. In this case, an energy store can be arranged in each case between these power stages, it being possible for the voltage ripple of said energy stores to be monitored for identification of aging.

The ripple of the voltage at the energy store (Cbulk) can be read, for example, via an analog-to-digital converter. This analog-to-digital converter can be part of an integrated control circuit, which can also influence the operation of the operating device. Thus, this integrated control circuit can actuate, for example, the actively clocked switch (S) of the power factor correction circuit or else the switch(es) of the driver circuit (LED driver).

If the operating device (A) has an interface, reading of the life to be expected may also be possible via this interface. The reading can for example automatically in the event that a predetermined value for the life to be expected is exceeded or else the present value for the life can be output in response to an external request via the interface. In the event that a limit value for the ripple of the voltage at the energy store (Cbulk) is exceeded, the operating device (A) can transmit a fault message via an interface since, as described, the fact that a limit value for the ripple of the voltage at the energy store (Cbulk) is exceeded indicates that a specific life of the energy store (Cbulk) has been exceeded.

What is claimed is:

1. An operating device (A) for a light-emitting means comprising at least one driver circuit for operating at least one light-emitting means, an energy store (Cbulk), which feeds the at least one driver circuit (LED driver), a power factor correction circuit, which is in the form of a boost converter and feeds the energy store (Cbulk), having a storage inductor (Lb), an actively clocked switch (S) and a rectifying diode (D), wherein the voltage at the energy store (Cbulk) is monitored, and the operation of the operating device (A) is changed if a ripple of the voltage at the energy store (Cbulk) exceeds a predetermined limit value and wherein the operation of the driver circuit (LED driver) is changed if the ripple of the voltage at the energy store (Cbulk) exceeds a predetermined limit value; a plurality of driver circuits (LED drivers) are fed directly or indirectly from the energy store (Cbulk), wherein, in the event that a limit value for the ripple of the voltage at the energy store (Cbulk) is exceeded, at least some of the driver circuits (LED drivers) are disconnected.

2. The operating device (A) for a light-emitting means as claimed in claim 1, wherein the operation of the power factor correction circuit is changed if the ripple of the voltage at the energy store (Cbulk) exceeds a predetermined limit value.

3. The operating device (A) for a light-emitting means as claimed in claim 1, wherein the voltage at the energy store (Cbulk) is decreased if the ripple of the voltage at the energy store (Cbulk) exceeds a predetermined limit value.

4. The operating device (A) for a light-emitting means as claimed in claim 2, wherein in the event that a limit value for the ripple of the voltage at the energy store (Cbulk) is exceeded, a control loop or control parameters of the power factor correction circuit is/are changed.

5. The operating device (A) for a light-emitting means as claimed in claim 1, wherein, in the event that a limit value for the ripple of the voltage at the energy store (Cbulk) is exceeded, the power output by the driver circuit (LED driver) is reduced.

6. The operating device (A) for a light-emitting means as claimed in claim 1, wherein the light-emitting means is an LED.

7. The operating device (A) for a light-emitting means as claimed claim 1, wherein the light-emitting means is a gas discharge lamp.

8. An operating device (A) for a light-emitting means comprising at least one driver circuit for operating at least one light-emitting means, an energy store (Cbulk), which feeds the at least one driver circuit (LED driver), a power factor correction circuit, which is in the form of a boost converter and feeds the energy store (Cbulk), having a storage inductor (Lb), an actively clocked switch (S) and a rectifying diode (D), wherein the voltage at the energy store (Cbulk) is monitored, and the operation of the operating device (A) is changed if a ripple of the voltage at the energy store (Cbulk) exceeds a predetermined limit value and wherein the operation of the driver circuit (LED driver) is changed if the ripple of the voltage at the energy store (Cbulk) exceeds a predetermined limit value, wherein the operating device (A) transmits or optically signals a fault message via an interface in the event that a limit value for the ripple of the voltage at the energy store (Cbulk) is exceeded.

9. A lighting unit having an operating device (A) for a light-emitting means as claimed in claim 1.

10. A method for operating light-emitting means, wherein the light-emitting means is operated by at least one driver circuit (LED driver), a power factor correction circuit feeds the energy store (Cbulk), and an energy store (Cbulk) feeds the at least one driver circuit (LED driver), the method comprising:

monitoring the voltage at the energy store (Cbulk), operating the light-emitting means depending on the detected ripple of the voltage at the energy store (Cbulk); and changing the operation of the driver circuit (LED driver) if the detected ripple of the voltage at the energy store (Cbulk) exceeds a predetermined limit value, wherein temperature monitoring at the energy store (Cbulk), the power factor correction circuit or the at least one driver circuit (LED driver) is performed and, as a result of a predetermined limit temperature being exceeded, a reduction in the power transmitted to the light-emitting means is performed, wherein the value of the limit temperature to be predetermined is set depending on the detected ripple of the voltage at the energy store (Cbulk).

* * * * *